Feb. 15, 1966 W. L. COOK 3,234,738
LOW TEMPERATURE POWER CYCLE
Filed Oct. 11, 1962
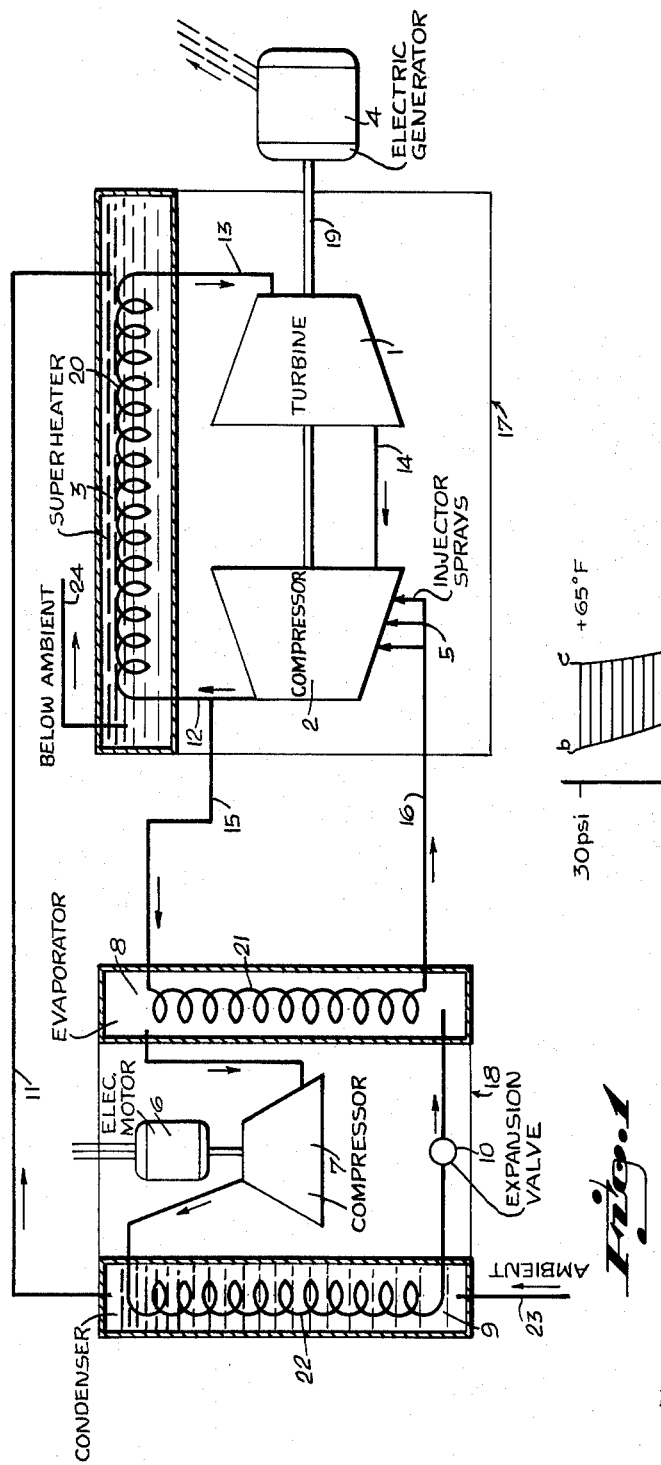
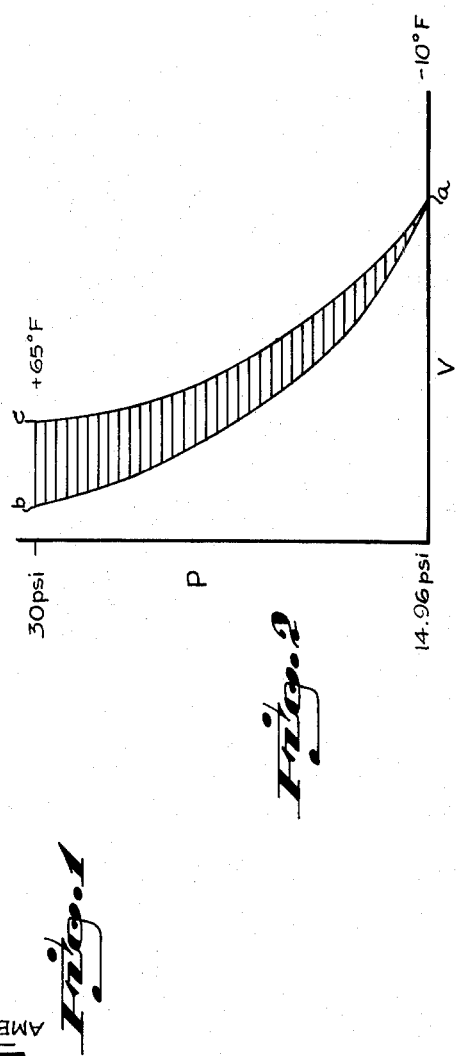
INVENTOR.
WILFRED L. COOK
BY E. H Schmidt
ATTORNEY.

United States Patent Office 3,234,738
Patented Feb. 15, 1966

3,234,738
LOW TEMPERATURE POWER CYCLE
Wilfred L. Cook, 3230 SW. 23rd Terrace, Miami, Fla.
Filed Oct. 11, 1962, Ser. No. 229,828
9 Claims. (Cl. 60—59)

My invention relates to low temperature power cycles and is directed particularly to a new cyclic gas turbine power plant.

The principal object of my invention is to provide a low temperature closed cycle turbine system wherein there is no point of heat rejection to a system or body at lower temperature in the operating cycle, and wherein heat is picked up from "surroundings" to offset operational losses occasioned by friction, windage and heat dissipation.

A more particular object is to provide a novel cyclic gas turbine system wherein superheat is extracted from the working fluid during the compression phase to reduce the work of compression and, instead of being rejected, is recovered in a superheater and added to the working fluid at a higher temperature level together with indirect solar heat before passing into the turbine.

Yet another object of the invention is to provide a gas turbine system of the character described including a prime mover power frame which comprises a turbine, a compressor and a superheater, and an auxiliary frame or system which comprises a heat exchanger adapted to extract a substantial amount of superheat which otherwise would have been generated in back work in the power frame, and add to it indirect solar heat derived, for example, from locally available water, which total heat is delivered to the superheater to perform turbine work.

Still another object is to provide a cyclic gas turbine system of the above nature suitable as in auxiliary power unit to a steam condensing plant, the usual steam condenser being replaced by the cycle superheater, thereby permitting recovery of a substantial part of the energy ordinarily wasted in latent heat in the condenser.

Yet another object is to provide, in a cyclic gas turbine system, means for deriving energy from indirect solar heat eliminating the use of fossil fuel or any other hydrocarbon fuel.

Still another object is to provide a gas turbine system of the character described which will be simple in construction, compact, low in capital cost, suitable for operation over a wide range of climatic conditions and with local water or air having a wide range of ambient temperatures, and which will be foolproof and durable in operation.

Other objects, pictures and advantages of the invention will be apparent from the following description when read with reference to the accompanying drawings.

In the drawings,

FIG. 1 illustrates schematically a preferred form of my novel low temperature closed cycle gas turbine system, and FIG. 2 is graphical representation on the P–V plane of the compression and expansion phases of an operating cycle of the system.

Referring now in detail to the drawings, 17 in FIG. 1 designates a prime mover power frame and 18 designates an auxiliary heat exchanging frame operating in conjunction with said power frame as hereinbelow more particularly described. The power frame 17 comprises a gas turbine 1, directly mechanically coupled for simultaneous rotation with a compressor 2. Power is taken off the common drive shaft 19 by an electric generator 4, for example, extending from the power frame 17. The power frame 17 further comprises a superheater 3 of the shell and tube type, or any other suitable efficient heat exchanger. The heat exchange element 20 of the superheater 3 is connected between the discharge manifold of the compressor 2 and the intake manifold of the turbine 1. For the purpose hereinafter appearing, the compressor 2 is fitted with a plurality of injection spray nozzles, generally indicated at 5, which nozzles are adapted to inject, as a spray, liquified working fluid of the system at various stages of compression. The discharge manifold of the compressor 2 is tapped as at 15 between said compressor and the superheater 3 to draw off gas in an amount equivalent to that spray-injected in at spray nozzles 5, as is hereinbelow more fully described.

The auxiliary heat exchanging frame 18 comprises a gas compressor 7 directly driven by an electric motor 6, or, alternatively, a power take off from the turbine shaft. The heat exchanging frame further comprises an evaporator-coupler condenser 8, the high temperature side of the condensing coil 21 of which connects with the bleeder tap 15 coming from the main compressor manifold of the power frame 17. The low temperature liquid line 16 of the coil 21 connects with the injection spray nozzles 5.

The auxiliary heat exchanging frame 18 also comprises another heat exchanger or condenser 9, the high temperature side of the coil 22 of which connects with the discharge of the compressor 7. The liquid low temperature side of the coil 22 connects through an expansion valve 10 into the shell of the evaporator side of the evaporator-coupler condenser 8, wherein the gas is expanded and picks up heat from coil 21 and is drawn from the high side into the intake of the auxiliary compressor 7, as in a typical refrigerating cycle.

The salient feature of my invention resides in the utilization of indirect solar heat, whether stored in water, air or any other medium, to add superheat to the working fluid in the power unit. To this end, by way of example, local water containing heat at ambient temperature is passed from a conduit 23 through the condenser 9 wherein it picks up additional heat extracted from the power frame working fluid, and passes it through conduit 11 into the high temperature side of the shell of the power unit superheater 3. The water gives off a substantial portion of its heat to the superheater coil 20, imparting superheat to the working fluid, and is then discharged at a temperature below ambient through a discharge or waste conduit 24.

Although I show the local water passing through and picking up additional heat from the auxiliary heat exchanging frame 18 before introducing it into the superheater 3, this is not essential, but only to increase overall efficiency in instances where the heat given up in condenser 9 is not in demand for other use. Thus, it is to be noted that local water at ambient temperature could, alternatively, be introduced directly into the superheater 3 of the power frame 17, and still achieve an operating cycle.

Considering now the operation of the system, it is first to be noted that the power frame working fluid is preferably a refrigerant gas having a wide capacity for generating reducible superheat during compression. In the following description, methyl-chloride in an amount equal to a whole multiple of one pound is utilized as such a suitable working fluid. Methyl-chloride gas at 65 degrees Fahrenheit and 30 p.s.i. absolute having an enthalpy of 207.71 B.t.u., which would indicate 8.71 B.t.u. of superheat, is expanded through the turbine 2 to −10 degrees Fahrenheit and 14.96 p.s.i. absolute to an enthalpy of 194.87 B.t.u., absorbing 12.84 B.tu of energy from the working fluid (see FIG 2). The working fluid (methyl-chloride) is passed directly from the exhaust of the turbine 1 to the intake of the main compressor 2, where, if ideally compressed, its temperature would be increased to 21.4 degrees Fahrenheit at 30.0 p.s.i. absolute with an enthalpy of 199.0 B.t.u By the use of the injection sprays 5, the generation of superheat in the compression phase is substantially eliminated whereby a dry saturate compression is achieved. During this compression phase, liquid methyl-chloride in the amount of 0.08± pounds per pound of working fluid is introduced into the working fluid through the injection sprays 5, where under latent heat of evaporation, the superheat ordinarily generated in the compression phase is absorbed as a gas. The bleeder line 15 taps off an equivalent amount (0.08± pounds per pound of working fluid) of methyl-chloride in the gaseous phase which is delivered to the auxiliary heat exchanging frame 18 for liquifaction. The major portion of the working fluid discharged by the compressor in passing through coil 20 of the superheater picks up superheat in the amount of 8.71 B.t.u. per pound, which is an amount substantially equivalent to that extracted during the compression phase.

As described above, water circulation adds the heat that superheats the gaseous working fluid in the superheater coil 20.

Referring to the graph of FIG. 2, it will be seen that the compression phase $a-b$ works along a polytropic curve that reflects pressures and temperatures at dry saturate heat for the working fluid. Line $b-c$ delineates the addition of superheat to the working fluid in the superheater 3. Curve $c-a$ represents adiabatic expansion to $a$, the point of beginning. The shaded portion within the curves indicates superheat, and also indicates an ideal theoretical indicator card. It is to be noted that this cycle projects an indicator card entirely different from any other previously known basic cycle in that the expansion and compression curves meet at a point at the lower datum plane. This is because there is no point of heat rejection to a system or body at lower temperature.

It will thus be apparent that my novel gas cycle for the first time achieves a prime mover of the gas turbine type operating on solar energy and which reaches down below ambient temperature to lengthen the expansion phase between the upper and lower datum planes. This is accomplished, moreover, without the use of costly heat collector fields now used in the Rankine type of solar energy plants, making possible use in marine propulsion, etc., where space is at a premium. Furthermore, my novel cycle is capable of 24 hour a day operation over indefinite periods of time.

While I have illustrated and described herein only one form in which the invention may conveniently be embodied in practice, this form is given by way of example only and not in a limiting sense. The invention, in brief, comprises all the embodiments and modifications coming within the scope of the following claims.

What I claim is:

1. In a cyclic gas turbine system, the combination comprising, a turbine, a compressor mechanically connected to said turbine for simultaneous operation therewith, a first conduit communicating between the discharge of said compressor and the intake of said turbine, a heat exchanger connected in series in said first conduit, a second conduit communicating directly between the discharge of said turbine and the intake of said compressor and providing a return path to said compressor, said compressor, said first conduit, said heat exchanger, said turbine and said second conduit constituting a fluid flow circuit, a quantity of gaseous working fluid in said system, means for inhibiting the formation of superheat in the working fluid while being compressed in said compressor, and mean for adding heat to said working fluid at said heat exchanger, said gaseous fluid in said fluid flow circuit remaining in its gaseous state throughout its cyclic operation therein.

2. The invention as defined in claim 1, wherein said working fluid comprises a refrigerant gas having a wide capacity for generating reducible heat during compression, and wherein said heat adding means comprises local water at ambient temperature passed through said heat exchanger in heat exchanging relation to said working fluid.

3. In a cyclic gas turbine system, the combination comprising, a turbine, a compressor mechanically connected to said turbine for simultaneous operation therewith, a first conduit communicating between the discharge of said compressor and the intake of said turbine, a heat exchanger connected in series in said first conduit, a second conduit communicating directly between the discharge of said turbine and the intake of said compressor and providing a return path to said compressor, said compressor, said first conduit, said heat exchanger, said turbine and said second conduit constituting a fluid flow circuit, a quantity of gaseous working fluid in said system, means for inhibiting the formation of superheat in the working fluid while being compressed in said compressor, and means for recovering the heat used in said inhibition of formation of superheat and adding it together with indirect other heat to said working fluid at said heat exchanger, said gaseous fluid in said fluid flow circuit remaining in its gaseous state throughout its cyclic operation therein.

4. The invention as defined in claim 3, wherein said working fluid comprises a refrigerant gas having a wide capacity for generating reducible heat during compression.

5. The invention, as defined in claim 3 wherein said working fluid comprises methyl-chloride.

6. The invention as defined in claim 1, wherein said superheat inhibiting formation means comprises a refrigerating system and means for tapping a small quantity of said working fluid at the discharge of said compressor, condensing it in said refrigerating system, and injecting it as a spray at the intake of said compressor.

7. The invention as defined in claim 3, wherein said superheat inhibiting formation means comprises a refrigerating system and means for tapping a small quantity of said working fluid at the discharge of said compressor, condensing it in said refrigerating system, and injecting it as a spray at the intake of said compressor.

8. The invention as defined in claim 7, wherein said heat recovery means comprises a heat exchange element operative to transfer heat rejected by said refrigerating system.

9. The method of achieving a low temperature power cycle in cyclic gas turbine prime mover power plants which comprises, compressing a gaseous working fluid along a polytropic curve at dry saturate heat, then adding superheat to the gaseous working fluid, then adiabatically expanding the gaseous working fluid to the point of beginning with substantially no heat rejection, the working fluid remaining in its gaseous state throughout its cycle of operation.

References Cited by the Examiner
UNITED STATES PATENTS

| | | | |
|---|---|---|---|
| 1,493,368 | 5/1924 | Merz | 60—26 |
| 1,785,651 | 12/1930 | Romagnoli | 60—36 |
| 2,471,476 | 5/1949 | Benning. | |
| 2,477,184 | 7/1949 | Imbert | 60—59 X |
| 2,721,728 | 10/1955 | Higgins | 62—238 |
| 2,875,589 | 3/1959 | Horn | 60—36 |
| 2,952,138 | 9/1960 | Russell | 62—238 |
| 2,969,637 | 1/1961 | Rowekamp | 60—26 |

FOREIGN PATENTS 657,020  9/1951  Great Britain.

SAMUEL LEVINE, *Primary Examiner.*